(12) United States Patent
Kurtzig et al.

(10) Patent No.: US 8,457,979 B2
(45) Date of Patent: Jun. 4, 2013

(54) METHOD AND APPARATUS FOR EXPERT VERIFICATION

(75) Inventors: Andrew Paul Kurtzig, San Francisco, CA (US); Emily Allison Su-Ian Reber Porter, San Francisco, CA (US)

(73) Assignee: Pearl.com LLC, San Francisco, CA (US)

( * ) Notice: Subject to any disclaimer, the term of this patent is extended or adjusted under 35 U.S.C. 154(b) by 0 days.

(21) Appl. No.: 13/439,728

(22) Filed: Apr. 4, 2012

(65) Prior Publication Data

US 2012/0197813 A1   Aug. 2, 2012

Related U.S. Application Data

(63) Continuation of application No. 12/854,836, filed on Aug. 11, 2010, now abandoned.

(60) Provisional application No. 61/233,046, filed on Aug. 11, 2009.

(51) Int. Cl.
  *G06Q 10/00* (2012.01)
  *G06Q 99/00* (2006.01)

(52) U.S. Cl.
  USPC .............................. 705/1.1; 705/319; 705/321

(58) Field of Classification Search
  None
  See application file for complete search history.

(56) References Cited

U.S. PATENT DOCUMENTS

| | | |
|---|---|---|
| 2002/0087496 A1 | 7/2002 | Stirpe et al. |
| 2006/0287970 A1 | 12/2006 | Chess et al. |
| 2009/0204426 A1* | 8/2009 | Thorne et al. ..................... 705/2 |
| 2011/0040694 A1 | 2/2011 | Kurtzig et al. |
| 2011/0041173 A1 | 2/2011 | Kurtzig et al. |

FOREIGN PATENT DOCUMENTS

WO   2011/019852 A1   2/2011

OTHER PUBLICATIONS

International Search Report and Written Opinion from PCT Application No. PCT/US10/45232 dated Oct. 1, 2010.
Office Action from U.S. Appl. No. 12/854,836 dated Jul. 18, 2012.

* cited by examiner

*Primary Examiner* — Jonathan Ouellette
(74) *Attorney, Agent, or Firm* — Zilka-Kotab, PC

(57) ABSTRACT

In exemplary embodiments, an apparatus and method for verifying experts on a consultation system is provided. Identity and credential information is received at a web server from a potential expert. A selection of a category that the potential expert wants to be admitted is also received. The identity information and at least a portion of the credential information may be verified. The potential expert is accepted as an expert based in part on a result of the verifying of the identity and credential information. Once accepted, an account associated with the potential expert is activated to allow the potential expert to become an expert and to allow the expert to provide answers on the consultation system when the potential expert is accepted.

17 Claims, 11 Drawing Sheets

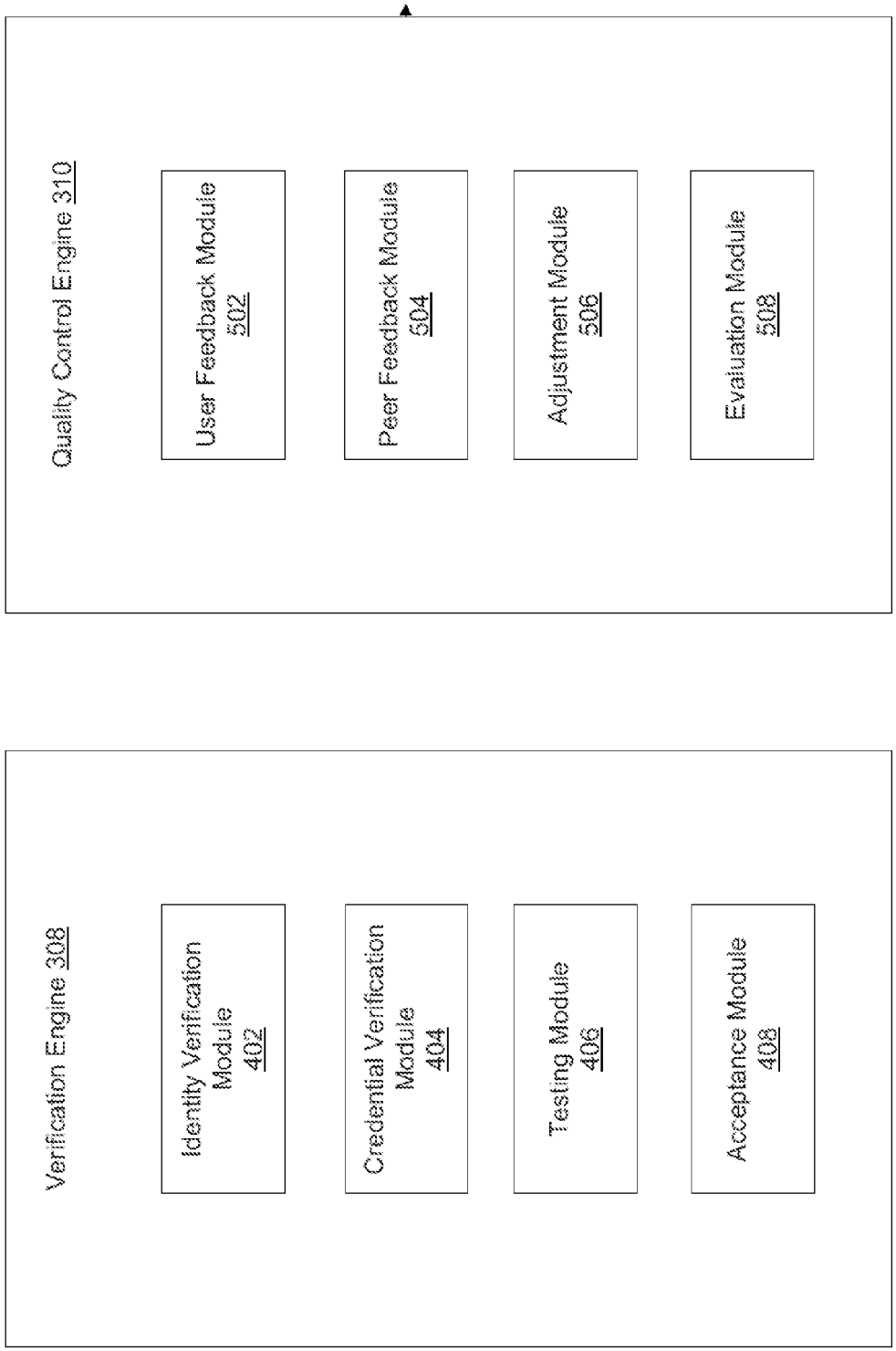

Become an Expert on JustAnswer

Here's how to apply

① Complete a brief application process
▷ Sign up and build your profile
▷ Take a short quiz in your area of expertise ② Verify your credentials in your area of expertise
▷ Provide us with your credentials to be submitted to a third-party for verification.
▷ You may have to meet other requirements depending on your area of expertise.

See Requirements by Category  [ Legal Experts ▽ ]

All legal Experts are required to have:
Attorney, Barrister or Solicitor license or certificate that is active and in good standing

Interested? Qualified?

[ Apply Now ]

Questions? Check out the Expert FAQ

FIG. 8

3. Select Expert Categories

Select a Category:

Select categories to apply to and tell us why you qualify as an Expert

Health Experts
-- Mental Health Experts
-- Dental Experts
Medical Experts
-- OB GYN Experts
-- Pediatrics Experts
-- Urology Experts
-- Eye Experts
-- Dermatology Experts
Legal Experts
-- Family Law Experts
-- Immigration Law Experts

Add Categories

FIG. 9

ID Verification

What year did you move into your property?

○ 1986
○ 1980
○ 1983
○ 1989
○ 1987

How many people were registered on the electoral role in 2004 at your address?

○ 4
○ 3
○ 1
○ 6
○ 9

Which is an initial of a person with whom you have shared your current address?

○ AT
○ CT
○ SC
○ LS
○ TS

Submit

FIG. 10

License, Education & Employment

Pick Category: Legal ▽

Then click on a section header (e.g., Education) to enter details.

Please tell us why you would like to be an Expert in the Legal Category on JustAnswer (100 character minimum):

License and Certification

Enter details on the license or certification that you hold that demonstrates your expertise in this category. If you do not have a license or certification, please complete the Education or Employment section.

FIG. 11

METHOD AND APPARATUS FOR EXPERT VERIFICATION

RELATED APPLICATIONS

This application is Continuation of U.S. patent application Ser. No. 12/854,836, filed Aug. 11, 2010, entitled "Method and Apparatus for Expert Verification," which claims priority benefit of U.S. Provisional Patent Application Ser. No. 61/233,046 filed on Aug. 11, 2009 entitled "Method and Apparatus for Expert Quality Control," which is incorporated herein by reference. The present application is also related to U.S. patent application Ser. No. 12/854,838 filed on Aug. 11, 2010 entitled "Method and Apparatus for Expert Quality Control," U.S. patent application Ser. No. 12/854,846 filed on Aug. 11, 2010 entitled "Method and Apparatus for Creation of New Channels in a Consultation System," and U.S. patent application Ser. No. 12/854,849 filed on Aug. 11, 2010 entitled "Method and Apparatus for Determining Pricing Options in a Consultation System," which are all incorporated herein by reference.

FIELD

The present application relates generally to the field of computer technology and, in specific exemplary embodiments, to methods and systems for expert verification.

BACKGROUND

Presently, many online websites allow for exchange of information. Some of these websites provide a question and answer type capability whereby a user may post a question and one or more other users may provide a reply. Often time, any user on the Internet may be able to post the reply. While some of these users may have some qualification or expertise in a particular area, there is no requirement that the user have particular qualifications in order to post a response to a question or that the user has his or her qualifications verified.

BRIEF DESCRIPTION OF DRAWINGS

Various ones of the appended drawings merely illustrate exemplary embodiments of the present invention and cannot be considered as limiting its scope.

FIG. 4 is a block diagram of an exemplary verification engine.

FIG. 5 is a block diagram of an exemplary quality control engine.

FIG. 8 is a screenshot of an example of a portion of an expert registration landing page.

FIG. 9 is a screenshot of an example of a portion of a category selection page.

FIG. 10 is a screenshot of an example of a portion of an ID verification page.

FIG. 11 is a screenshot of an example of a portion of a credential verification page.

DETAILED DESCRIPTION

Figure 1:
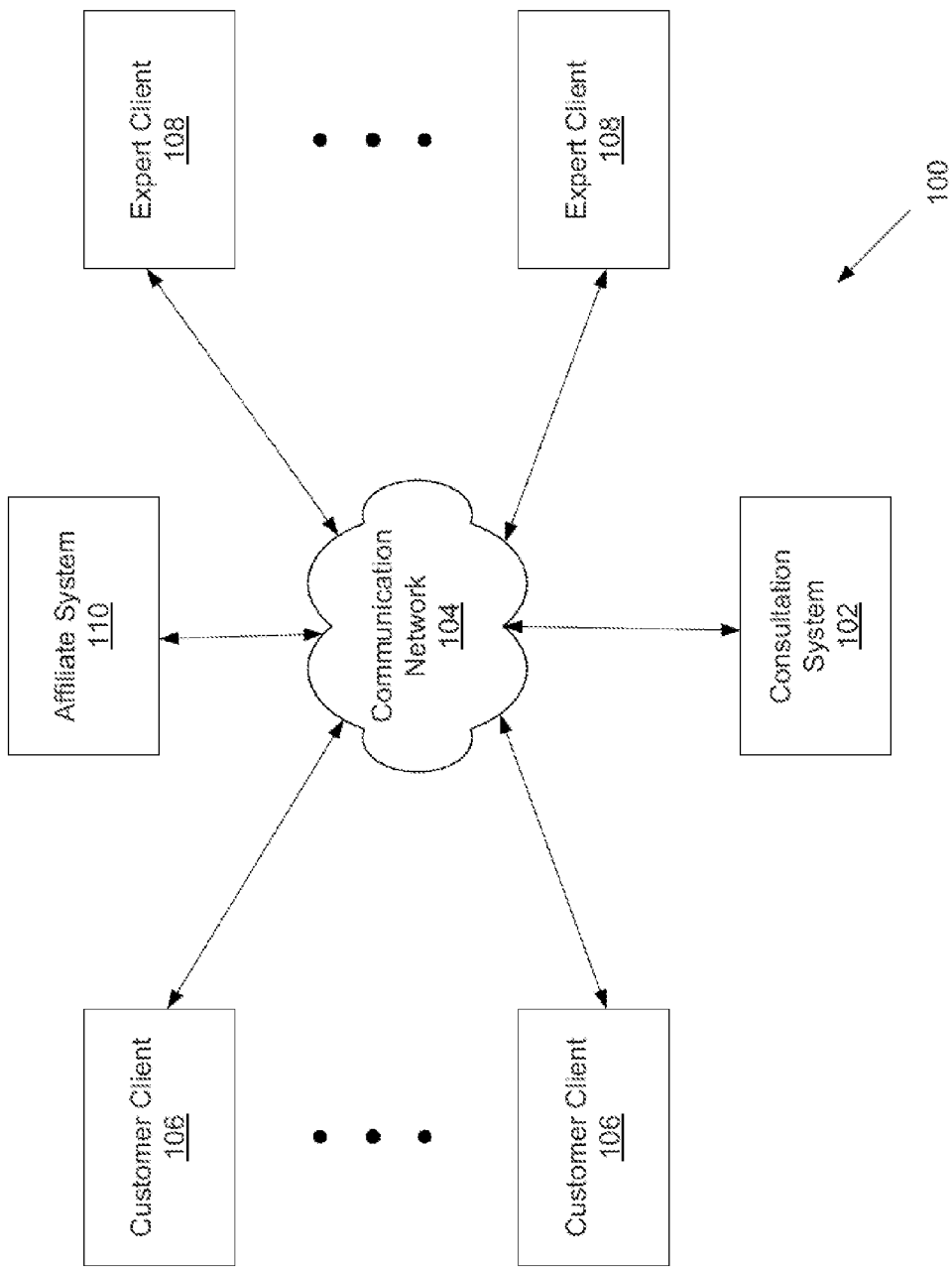
FIG. 1 is a diagram of an exemplary environment in which embodiments of the present invention may be practiced.

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on verification of experts, the embodiments are given merely for clarity and disclosure. Alternative embodiments may employ other systems and methods and are considered as being within the scope of the present invention.

Embodiments of the present invention provide systems and methods for expert verification. In exemplary embodiments, potential experts go through an application and registration process in order to be accepted and activated on a consultation system. Application and registration information is received from each potential expert. The application and registration information may include identification information and credentials of the potential expert. The application information may also include a selection of at least one category to which the potential expert wants to be admitted. The application and registration information may cause a potential expert's application to be rejected (e.g., if minimum requirements and standards are not met). If it does not cause a rejection, the application and registration information may be placed on hold, or verified, in part or in whole, to determine whether to accept the potential expert and activate an associated account; it also may be verified, in part or in whole, at a later point in time, for example, to determine whether to expand the categories into which the expert is admitted or to maintain as active the associated account. The application and registration information may also include various kinds of tests, such as subject matter proficiency tests, site usage tests, customer service skills tests, and other tests aimed to determine qualifications, quality, and likely performance. Should the potential expert be accepted based on the application and registration process, the potential expert becomes an expert on the consultation system and may be associated with one or more categories as an expert in the categories.

Once accepted and activated, the experts may provide answers to users and receive feedback in various forms from users and peers. Feedback on performance of an expert on the consultation system is received for the expert. The feedback may be from users of the consultation system, other experts on the consultation system, or third-parties with relevant expertise and may comprise direct and indirect feedback. The direct feedback may comprise one or more of rating the expert, rating the answers of the expert, receiving a complaint for the expert, receiving a survey on the expert or the answers of the expert, and receiving a compliment for the expert.

Indirect feedback comprises one or more of accepting a response provided by the expert, requesting a refund after receiving a response provided by the expert, paying a bonus to the expert, and opting into or out of future responses or communications from the expert (e.g., follow-up communications, marking communications from an expert as spam). The expert feedback may comprise a report on the expert whereby the report directed to one or more of the correctness or completeness of a response provided by the expert, the professionalism of the expert, and a violation of site policy committed by the expert. The expert feedback may further comprise a survey performed on the expert. Adjustment factors are recorded for the expert. The adjustment factors comprise public and non-public actions associated with the expert. The expert is then evaluated using the feedback and the adjustment factors. The evaluation may result in a score or ranking for the expert. Based on the score or ranking, the consultation system may perform various actions (e.g., granting and revoking privileges or access to certain questions, sending feedback and other information, suspending or deleting the accounts of experts with low scores). The score or rank may also be used to determine one or more of a payment amount, commission, bonus, and revenue share percentage for the expert. Thus, the performance of each expert may be reviewed using various forms of feedback in order to provide expert quality control (e.g., management of the quality of experts and answers) on the consultation system. Based on the scores, the consultation system may perform various actions (e.g., ranking, granting and revoking privileges or access to certain questions, sending feedback and other information, suspending or disabling the accounts of experts with low scores).

FIG. 1 shows an exemplary environment 100 in which embodiments of the present invention may be practiced. The exemplary environment 100 comprises a consultation system 102 coupled via a communications network 104 to one or more user clients 106 and expert clients 108. The communication network 104 may comprise one or more local area networks or wide area networks such as, for example, the Internet and telephone systems.

In exemplary embodiments, the consultation system 102 provides a forum where users may post or pose questions for which experts may provide answers. The consultation system 102 may provide the forum via a website. In some embodiments, at least portions of the forum (e.g., asking of questions or receiving of responses) may occur via the website, mobile phone, text messaging, telephone, video, VoIP, other websites, or other computer software applications. Because the consultation system 102 is network based (e.g., Internet, public switched telephone network (PSTN), cellular network), the users using the consultation system 102 and experts providing answers may be geographically dispersed (e.g., may be located anywhere in the world). As a result an expert may provide answers to a user thousands of miles away. Additionally, the consultation system 102 allows a large number of users and experts to exchange information at the same time and at any time.

By using embodiments of the present invention, a user posting a question may easily obtain a tailored answer. Accordingly, one or more of the methodologies discussed herein may obviate a need for additional searching for answers, which may have the technical effect of reducing computing resources used by one or more devices within the system. Examples of such computing resources include, without limitation, processor cycles, network traffic, memory usage, storage space, and power consumption.

In various embodiments, a user may pose a question and one or more experts may provide answers. In various embodiments, the question may be matched with a category of experts, more specific set of experts, or even individual experts, sometimes on a rotating basis by user selection, a keyword based algorithm, a quality based algorithm (or score or rating), or other sorting mechanism that may include considerations such as, for example, likely location, time zone. A back-and-forth communication can occur. The user may accept an answer provided by one or more of the experts. In an alternative embodiment, the user may be deemed to have accepted the answer if the user does not reject it. By accepting the answer, the user validates the expert's answer which, in turn, may boost a score or rating associated with the expert. The user may also pay the expert for any accepted answers and may add a bonus. The user may also leave positive, neutral or negative feedback regarding the expert. More details regarding the consultation system 102 and its example functions will be discussed in connection with FIG. 2 below.

The exemplary user client 106 is a device associated with a user accessing the consultation system 102 (e.g., via a website, telephone number, text message identifier, or other contact means associated with the consultation system 102). The user may comprise any individual who has a question or is interested in finding answers to previously asked questions. The user client 106 comprises a computing device (e.g., laptop, PDA, cellular phone) which has communication network access ability. For example, the user client 106 may be a desktop computer initiating a browser for access to information on the communication network 104. The user client 106 may also be associated with other devices for communication such as a telephone.

In exemplary embodiments, the expert client 108 is a device associated with an expert. The expert, by definition, may be any person that has, or entity whose members have, knowledge and appropriate qualifications relating to a particular subject matter. Some examples of expert subject matters include health (e.g., dental), medical (e.g., eye or pediatrics), legal (e.g., employment, intellectual property, or personal injury law), car, tax, computer, electronics, parenting, relationships, and so forth Almost any subject matter that may be of interest to a user for which an expert has knowledge and appropriate qualifications may be contemplated. The expert may, but does not necessarily need to, have a license, certification or degree in a particular subject matter. For example, a car expert may have practical experience working the past 20 years at a car repair shop. In some embodiments, the expert may be a user (e.g., expert can post a question).

The expert client 108 may comprise a computing device (e.g., laptop, PDA, cellular phone) which has communication network access ability. For example, the expert client 108 may be a desktop computer initiating a browser to exchange information via the communication network 104 with the consultation system 102. The expert client 108 may also be associated with other devices for communication such as a telephone.

In accordance with one embodiment, an affiliate system 110 may be provided in the exemplary environment 100. The affiliate system 110 may comprise an affiliate website or other portal which may include some of the components of the consultation system 102 or direct their users to the consultation system 102. The affiliate system 110 may also be associated with other devices for communication such as a telephone. For example, the affiliate system 110 may provide a website for a car group. A link or question box may be provided on the affiliate website to allow members of the car group to ask questions. Answers in response to the questions may be provided, in part, from the consultation system 102, or the member asking the question may be directed to the consultation system 102 for the answer. The members may, in some cases, only have access to certain categories or experts. In one embodiment, a RSS feed may be used to feed data from the consultation system 102 to the affiliate system 110. The users of the affiliate system 110 may be tagged with the affiliate depending on if and how the users are registered with the consultation system 102. It should be noted that the affiliate system 110 may comprise any type or category of affiliate sites. In some cases, the affiliate system 110 may involve questions being answered by the affiliate or persons involved with the affiliate.

The environment 100 of FIG. 1 is exemplary. Alternative embodiments may comprise any number of consultation systems 102, user clients 106, expert clients 108, and affiliate systems 110 coupled together via any type of one or more communication networks 104, and still be within the scope of exemplary embodiments of the present invention. For example, while only one consultation system 102 is shown in the environment 100, alternative embodiments may comprise more than one consultation system 102. For instance, the consultation systems 102 may be regionally established.

Figure 2:
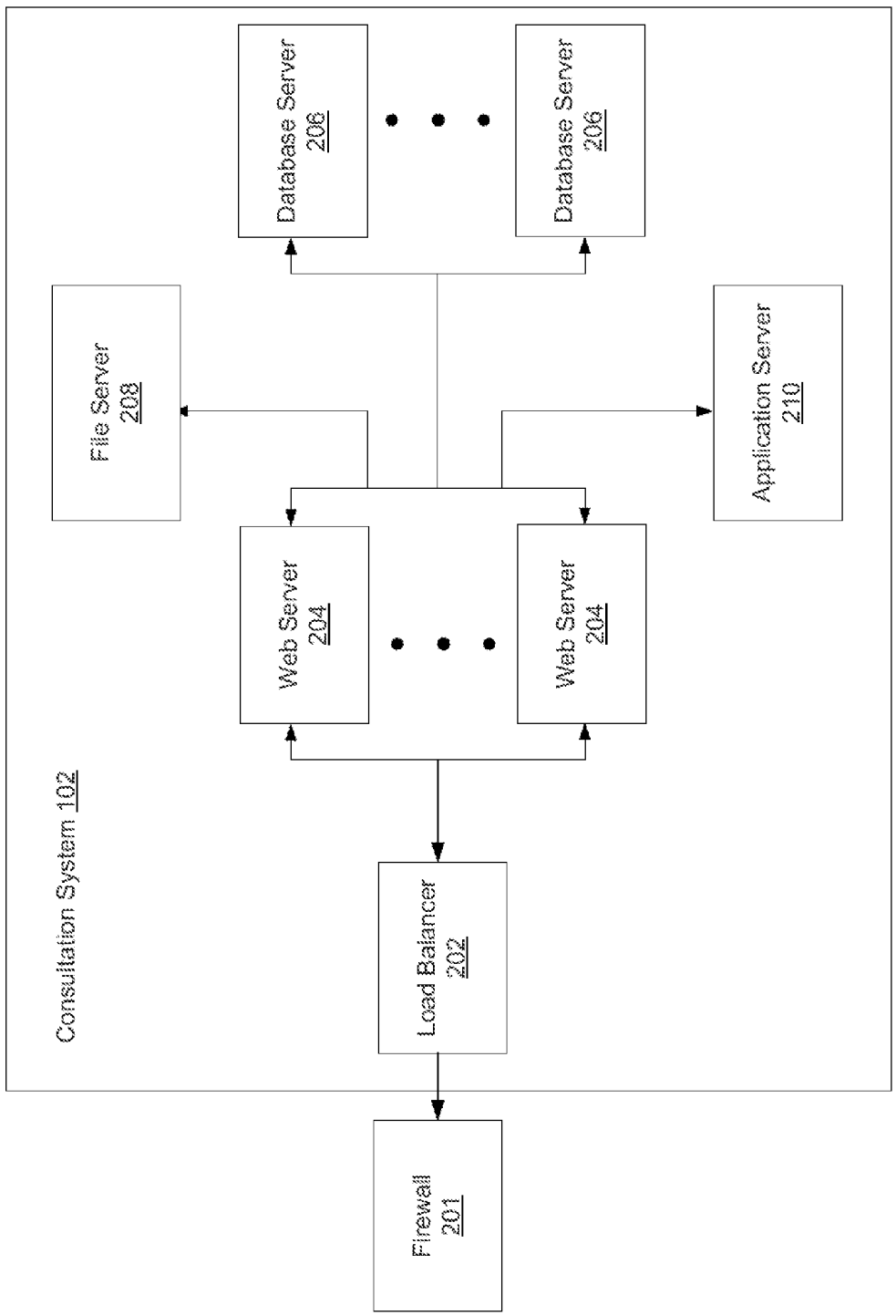
FIG. 2 is a block diagram of an exemplary consultation system.

Referring now to FIG. 2, the consultation system 102 is shown in more detail. In exemplary embodiments, the consultation system 102 may comprise a load balancer 202 which distributes work between two or more web servers 204 in order to optimize resource utilization and minimize response time. In some embodiments, a firewall 201 may be provided prior to the load balancer 202.

In exemplary embodiments, the web servers 204 are responsible for accepting communications from the user client 106 (e.g., request or question) and expert client 108 (e.g., response) and serving the response including data content. In some instances, the request and response may be in HTTP or HTTPS which will result in HTML documents and linked objects (e.g., images) being provided to the user and expert clients 106 and 108. The communications may include, for example, questions from the users, answers from the experts, acceptance from the user, payment information, account update information videos, documents, photographs and voice The web server 204 will be discussed in more detail in connection with FIG. 3.

Information used by the web server 204 to generate responses may be obtained from one or more database servers 206 and a file server 208. The exemplary database servers 206 store data or are coupled with data repositories storing data used by the consultation system 102. Examples of data include user information (e.g., username, email address, credit card or other payment information), expert information (e.g., name, licenses, certifications, education and work history), previously asked questions and corresponding answers, and transaction information (e.g., payment, accepts, etc.). Essentially any data may be stored in, or accessed by, the database servers 206 including every user and expert interaction with the consultation system 102. Examples of interactions include how many questions the user has asked, which experts provided answers to the questions, and whether the user accepted the answers and paid the expert.

Content on the database servers 206 (or accessed by the database servers 206) may be organized into tables, and the tables may be linked together. For example, there may be one table for every question that has been previously asked, another table for posts (e.g., answers) to each question, and other tables for users and experts. In one example of the present invention, over 430 tables or spreadsheets are linked together.

In some embodiments, the database servers 206 may include logic to access the data stored in the tables. The logic may comprise a plurality of queries (e.g., thousands of queries) that are pre-written to access the data. For example, one query may be directed to determining every question that a particular user has asked. In this example, a user table may be searched based on this query to determine the user's unique user name or identity. Once the user name is determined, a question table may be accessed to find all questions ever asked by a user having the particular user name.

It should be noted that the functions of the database server 206 may be embodied within the web server 204. For example, the database servers 206 may be replaced by database storage devices or repositories located at the web servers 204. Therefore, any reference to the database server 206 and database storage device are interchangeable. Alternatively, some or all of the query logic may be embodied within the web server 204.

In exemplary embodiments, a plurality of database servers 206 is provided. The plurality of database servers 206 may share data and thus be identical (or close to being identical). By having identical database servers 206, load balancing and database backup may be provided. For example, if two database servers 206 are embodied in the consultation system 102, then half of the data accesses or queries may be directed to one database server 206 and the other half to the second database server 206.

The file server 208 stores or accesses files such as, for example, pictures, videos, voice files, PDF documents, Word documents, and PowerPoint presentations. When a particular file is requested or required in order to generate a response, the web server 204 may query the file server 208 for the file. Alternatively, the files may be stored at the database server 206 or other database storage devices, for example.

An application server 210 may also be provided in the consultation system 102. The application server 210 may provide applications and functions that are centralized to the consultation system 102. For example, the application server 210 may perform credit card processing with a bank that is coupled to the consultation system 102 via a network (e.g., the communication network 104).

It should be appreciated that in alternative embodiments, the consultation system 102 may include fewer or more components than shown in FIG. 2. For example, the consultation system 102 may comprise any number of web servers 204, database servers 206, file server 208, and application server 210. In another example, the file server 208 and application server 210 may be removed from the consultation system 102 and their functions performed by other servers in the consultation system 102. It will also be appreciated that the various servers may be embodied within each other and/or the consultation system 102 may be embodied within a single server. For example, the database server 206 may be embodied, as a storage device within the web server 204. It is also noted that the various servers of the consultation system 102 may be geographically dispersed within the exemplary environment 100.

Figure 3:
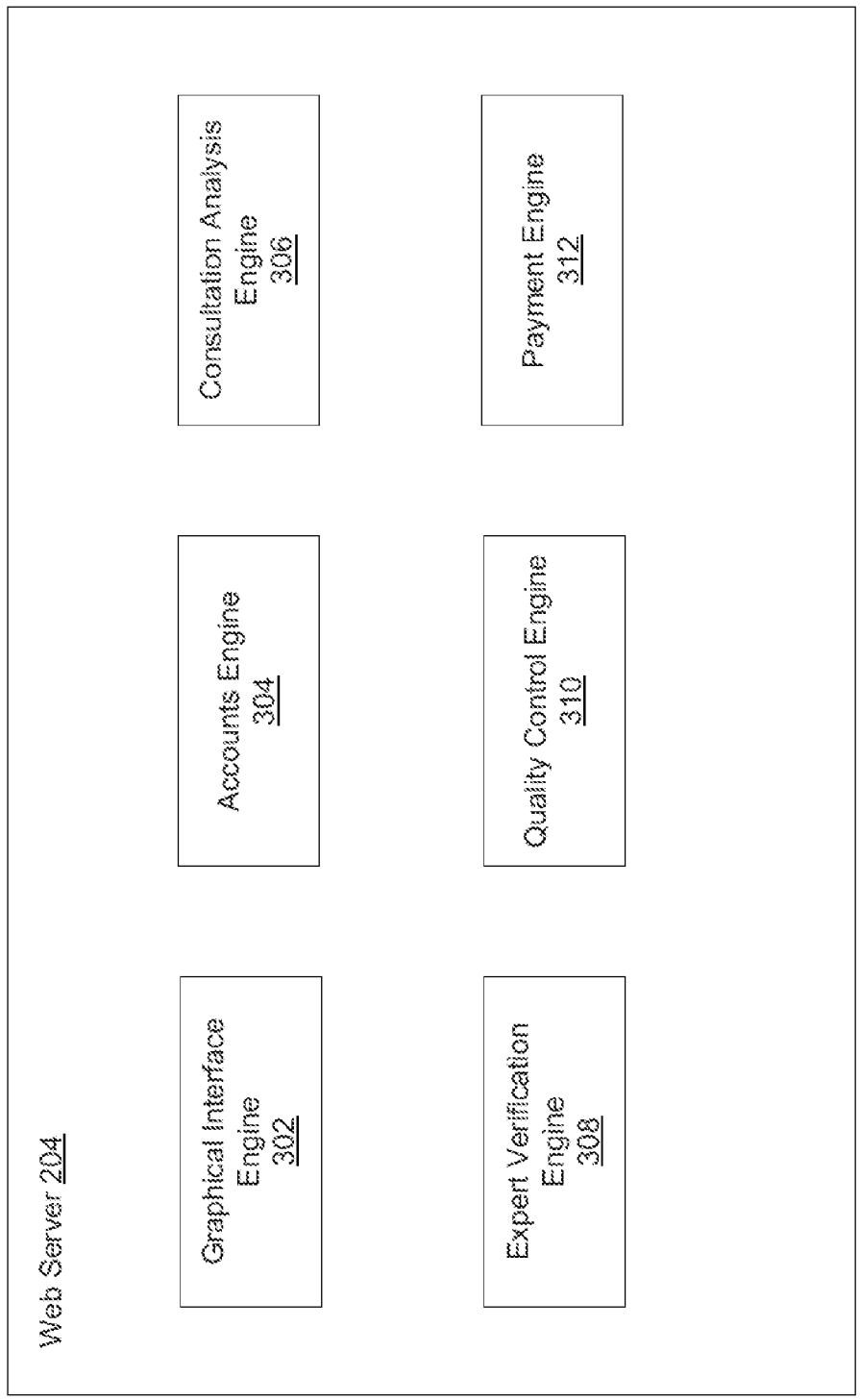
FIG. 3 is a block diagram of an exemplary web server.

Referring now to FIG. 3, one of the exemplary web servers 204 is shown in more detail. As discussed, the web servers 204 share in the workload in order to provide optimized performance. As such, each of the web servers 204 will include similar engines and modules. In the exemplary embodiment of FIG. 3, the web server 204 comprises a graphical interface engine 302, an accounts engine 304, a consultation analysis engine 306, an expert verification engine 308, a quality control engine 310, and a payment engine 312 communicatively coupled together.

The exemplary graphical interface engine 302 generates graphical representations provided via the web page. In exemplary embodiments, the graphical interface engine 302 builds a page (e.g., made up of HTML, Javascript, CSS, sound, video, images, and other multimedia) that is presented to the user client 106 or expert client 108. The page comprises static text (e.g., "Welcome to JustAnswer.") and dynamic data (e.g., "Hello, hulagirl. You joined 3 months ago; have asked 17 questions; have accepted 12 answers."). The dynamic data may be obtained, at least in part, from the database servers 206. In exemplary embodiments, the dynamic data may be retrieved using querying logic associated with the web server 204, the database server 206, or a combination of both, as discussed above.

The exemplary accounts engine 304 sets up and maintains user accounts with the consultation system 102. Initially, the accounts engine 304 may provide a registration page via the graphical interface engine 302 for an individual (e.g., a user or expert) to fill out. The information collected via the registration page may be stored in the database server 206. Examples of information include username, email address, and billing and payment information. With respect to experts, the accounts engine may also collect information regarding the identity of the expert, information on credentials (e.g., license and certification numbers, degrees including university attended and years of attendance, employment history), and other data relating to the expert and the expert's application. Accounts for users may be automatically established and activated based on certain actions taken by the user, such as asking a question, agreeing to the terms of the consultation system, or providing payment. However, experts, in accordance with exemplary embodiments, proceed through an acceptance and verification process. If accepted, an expert account may then be established and activated by the accounts engine 304. The verification process will be discussed in more detail below.

The consultation analysis engine 306 manages answers in response to questions which have been posted to the consultation system 102. In exemplary embodiments, the consultation analysis engine 306 will receive questions along with indications of a category or subject matter each question is directed to from users. In various embodiments, a user may utilize a question page to enter a question which the user wants an expert to answer. The question page may provide a field for entering the question, relevant information relating to the question (e.g. make and model of a car), as well as a selection box for selecting a subject matter expert under which the question should be posted to. In exemplary embodiments, other pages may be presented to the user before or after the question is submitted to experts, to obtain further data from or provide data to the user. For example, a question regarding how to change the battery in a specific type of car may be categorized as a car question or a question for that specific type of car. In some embodiments, the question will then be posted to a car care portion (e.g., car care web pages) of the consultation system 102. The question is also recorded into a corresponding table in the database server 206 (e.g., in a question table) and the user name of the user may also be entered into a corresponding table (e.g., user table). In some instances, the question may be outputted back to the user so that the user may confirm the question or edit the question if needed. The user may also provide an amount that the user is willing to pay for an accepted answer, in some embodiments, as an amount selected by the user from different options offered to the user.

Once the question is posted on the consultation system 102, experts may provide answers in response to the question. The questions may be posted or otherwise communicated to a general or subject matter specific question list of recent questions that have been posted by users, a more specific group of experts, or certain experts one-at-a-time. In various embodiments, the question list may be sorted by certain types of information such as time of posting, the amount the user is willing to pay (e.g., value), the user's history of accepting previous answers, information regarding the subject matter of the question, or whether replies have been previously posted. Experts may periodically review the question list or other communications alerting them to questions to determine if there are any questions that the expert would like to answer. The expert may base their determination, in part, on the complexity of the question, their expertise, the amount the user is willing to pay for an answer, or the user's history of accepting previous answers. In various embodiments, the user is able to place a deposit and name a price for an answer when posting the question or place the deposit after an expert has answered.

Should the expert decide to answer a question or request further information, depending on factors including location of the user and expert on the consultation system, the most convenient or preferred method of communication of the user or expert, or the original method of the user asking the question, an indication is provided to the user that there is an answer being offered or a request for further information, sometimes in the form of the answer or request itself. The indication may also comprise an e-mail, text message, or pop-up notification to the user. In some cases, the user may place a deposit (e.g., the amount agreed upon to be paid if an answer is accepted) after being given the opportunity to view a profile of the expert offering the answer or a portion of the answer.

The answer is provided to the user. The answer may be displayed on a web page (e.g., an answer page), provided via a chat session, provided via a voice or text message, provided via video, provided by a software application, provided by other social media means (e.g., social networking sites where the user has a personal profile or page), or provided by telephone, mobile phone, or VoIP. Upon review of answers posted in response to a question, the user decides if any of the answers are acceptable to the user. The user may accept one or more answers that are posted. In exemplary embodiments, the user will pay the expert posting any accepted answers. If a particular answer is exceptional, in exemplary embodiments, the user may also provide a bonus to the expert providing the exceptional answer. When the user accepts an answer, monies from the deposits may also be paid to a host of the question and answers platform (e.g., host of the consultation system 102).

In various embodiments, different pricing options may be used for determining what a user may pay for getting an answer to a question or what an expert may be paid for providing an answer. In one embodiment, the pricing options may vary for each category or subcategory based on a variety of factors. These factors may include, for example, question length, time of day, day of week, location, or the ability of a user to pay. Additionally, discounts may be offered (e.g., two for one, ask one question get second for 50% off, free for pro bono users). In other embodiments, pricing may be selected and paid for by third-parties (e.g. employers of the users). In yet other embodiments, a user may subscribe to a subscription plan (e.g., unlimited questions each month for a particular fee or up to 10 questions each month for another fee). In other embodiments, a user or expert may be allowed to adjust the price prior to, during, or after the interaction between the user and the expert.

Acceptance and non-acceptance actions are tracked by the consultation analysis engine 306. For example, every user's accept-to-question ratio may be tracked and may be published to experts. Thus, if the ratio is low, experts may not answer the user's questions in the future. Furthermore, the user's question posting privileges may be suspended or the user may be removed from the consultation system 102 if the ratio is low or falls below a ratio threshold. The tracked acceptance and non-acceptance information is stored to the database server 206, and may be used to evaluate the quality of the experts as is discussed herein.

The user may also provide comments and feedback after viewing or accepting one or more answers. The feedback may be provided as, for example, a written comment, star rating, numerical scale rating, or any other form of rating. The feedback is stored to the database server 206, and may be used in the quality control processing. User satisfaction surveys may also be sent to collect data on the user's experience with the site, the expert, or the answer the user received.

According to some embodiments, if the question has been previously answered, a query of the database server 206 may be performed. The answers to previously asked questions may be stored in corresponding answer tables in the database server 206. These embodiments may occur when, for example, a user searches (e.g., using Google) for previous questions and answers. Multiple instances of access to the same questions and/or answers may be provided via a cache. Some or all users may also be allowed to search some or all previous questions or answers via a search tool on the website, or some or all previous questions or answers may be displayed to users at the discretion of the host, affiliate, or expert of the consultation system.

The exemplary expert verification engine 308 performs verification and acceptance of experts. In accordance with exemplary embodiments, the expert verification engine 308 verifies information provided by the potential experts (or experts) or receives verification data used to verify the experts' identities or credentials. The verification may occur prior to allowing the expert to join the consultation system 102. Alternatively, the verification may occur any time after the expert has joined the consultation system 102. The verification engine 308 will be discussed in more detail in connection with FIG. 4 below. More than one verification may be performed for each expert, by requirement or by the expert's choice.

In exemplary embodiments, the quality control engine 310 evaluates experts in order to promote the high quality of experts in the consultation system 102. The evaluation may comprise scoring or ranking experts based on various elements. For example, the quality control engine 310 may access and review feedback associated with each expert and score each expert accordingly. The quality control engine 310 may also review other factors which may increase or decrease an expert's score or ranking. The quality control engine 310 will be discussed further in connection with FIG. 5.

The exemplary payment engine 312 manages the payment of fees. In accordance with exemplary embodiments, users pay experts for accepted answers to their questions, for example, by way of payments per questions, payments per answers, payments per time frame, or payments on subscription basis. In some instances, the user may provide a deposit in order to view answers prior to accepting the answers. The payment engine 312 may maintain a record of all these transactions. Additionally, the payment engine 312 may work with the application server 210, if provided, to process payments (e.g., credit card processing, PayPal processing).

Referring now to FIG. 4, the exemplary expert verification engine 308 is shown in more detail. The expert verification engine 308 verifies information provided by the potential experts (or experts) or receives verification data that verifies the experts' identities or credentials. The consultation system 102 may, in some embodiments, only accept experts once verified. In exemplary embodiments, the expert verification engine 308 comprises an identity verification module 402, a credential verification module 404, a testing module 406, and an acceptance module 408 communicatively coupled together. Alternative embodiments may comprise other modules as needed depending on the type of information to be verified (e.g., background or reference check module).

The identity verification module 402 manages verification of identity information provided by the potential expert (or expert). For example, the potential expert may provide one or more of a name, address, date of birth, full or partial or indicator of a social security number, and/or passport number. In some embodiments, the identity verification module 402 may access external databases (e.g., credit bureau databases or other third party ID verification systems) to check the entered information. In some embodiments, the identify verification information may be XML fed to a third party system. Additionally, the third party system or the consultation system 102 may provide identity test questions (e.g., in the form of multiple choices) or other checks to help confirm the identity of the applicant (e.g., potential expert). Such questions may include, for example, a year the applicant moved into their property and initials of a person with whom the applicant shares his current address. Essentially, any question that is known by the applicant (and relatively few others) may be used. Additionally or alternatively, some of this information may be verified manually (e.g., a copy of the driver's license, professional license, or passport is reviewed, or credit card name check is performed) and the identity verification module 402 receives the manual verification data and uses the manual verification data to verify the identity. If the identity of the applicant is not confirmed initially, the applicant may be given an opportunity to correct and resubmit the information, other processes involving the third party ID verification systems may be used, other internal manual ID verification processes may be used, or the applicant may be rejected.

The exemplary credential verification module 404 manages verification of credential information provided by the potential expert (or expert). Credential information may include, for example, licenses, certifications, employment history, and educational degrees. In some embodiments, the credential verification module 404 determines whether to send the credential information, as well as which credential information to send, to one or more credential verification systems. The determination may be based in part on whether the applicant meets the minimum requirements and standards of the consultation system 102 or category based on their credential information. The potential expert may have an opportunity to review these minimum requirements prior to applying. The minimum requirements may be based on, for example, characteristics of other experts in the category (e.g., work experience, licenses, certifications). Thus, for example, the entered credential information may be compared to characteristics of other successful experts on the consultation system 102. The determination may further be based on the applicant's performance on a test presented by the testing module 406, whether the ID verification is successful, and whether there is a need for that type of expert (or more of that type of expert). For example, there may be a limit placed on a number of experts allowed within a particular category, which may change over time. The credential verification module 404 may access external databases (e.g., credential verification systems such as a state bar association database or university database) to verify the credential information either directly or through a third-party verification system. The credential information may also be verified manually (e.g., an agent associated with the consultation system 102 may call a university), and the manual verification data is received by the credential verification module 404 and uses the manual verification data to verify the credentials.

The testing module 406 may be used to provide subject specific tests to potential experts in order to evaluate their competence in a subject matter with which each potential expert wants to be associated. The subject specific tests may be a multiple choice quiz and/or a writing test, and may also be given to existing experts as well as potential experts. These subject specific tests may be scored either automatically or manually. A test threshold may be utilized whereby if the potential expert scores below a threshold, the potential expert will not be accepted by the consultation system 102, and if the potential expert scores above the test threshold, then the potential expert is more likely to be accepted by the consultation system 102. The testing module 406 may also provide site user tests to potential and existing experts in order to evaluate their knowledge of how to use the site. The results of test given to existing experts may be used to suspend or remove experts that perform poorly on the test, or experts may be allowed to take the test several tunes until they attain a 100% passing score. Other tests may also be provided by the testing module 406, for example, customer service skills or psychometric tests.

The acceptance module 408 determines whether to accept a potential expert and activate or, in the case of an existing expert expand an associated account. In some embodiments, if the identity and at least a portion of the credential information is verified, then the acceptance module 408 may accept the potential expert and activate the account. In some embodiments, the potential expert may also need to pass a threshold on a subject matter, writing, site user and/or other test to be accepted. In some embodiments, the acceptance module 408 may also determine whether to accept a potential expert and activate an associated account based on the ratio of asked and answered questions on the site and/or measurement of time before questions are being answered. Activation of the account allows the expert to begin posting answers on the consultation system 102 as well as to receive payment for their accepted answers.

Referring now to FIG. 5, the exemplary quality control engine 310 is shown in more detail. The quality control engine 310 evaluates experts in order to maintain quality in the consultation system 102. The evaluation may comprise scoring or ranking experts. The quality control engine 310 may comprise a user feedback module 502, a peer feedback module 504, an adjustment module 506, and an evaluation module 508 communicatively coupled together. Further quality control modules may be provided as needed to incorporate other factors which may be used to score or rank experts, such as expert and answer characteristics and statistics, and third-party sources of information and feedback.

The user feedback module 502 manages feedback based on users' experiences with experts. The user feedback may include direct feedback such as, for example, written comments provided by users, a positive/neutral/negative scoring, complaints, compliments, and user surveys. Indirect feedback may also be included in the user feedback. Examples of indirect feedback include how often users accept an expert's answer, give bonuses to experts, request refunds, choose to receive answers from or not receive answers from the expert (e.g., does not want to receive any responses from the expert in the future), directly or indirectly rate an expert's viewable profile or background, and how often users return to ask another question after receiving an answer from the expert.

The peer feedback module 504 manages feedback provided by other experts on the consultation system 102. For example, a first expert may file a positive or negative report on a second expert or the second expert's answer. The report may indicate whether the first expert agrees with the posted answer of the second expert, the reason for the agreement or disagreement, or a new model answer. The report may indicate the type of problem being reported (e.g., whether the report is being submitted due to a problem with the correctness or completeness of an answer, an unprofessional remark or tone, or potential violations of the law or applicable agreements). In some embodiments, additional peer review may be solicited and/or provided regarding the report filed by the first expert. In some embodiments, the first and second experts may have an opportunity to correspond with one another, for example, by the second expert agreeing with the first expert's report or filing a refutation of the report, and by the first expert responding or agreeing to withdraw the report. Peer feedback may also include experts scoring randomly, systematically, or manually selected anonymized or non-anonymized answers posted on the consultation system 102. Expert quality surveys may be periodically conducted in certain categories regarding the best or worst experts in terms of quality and peer-to-peer interactions. In some embodiments, the experts solicited for their additional peer review may be selected at random, based on their own characteristics, by vote of their peers, or by a system of points or other measurements obtained through the peer feedback module 504. In some embodiments, the experts may be allowed to identify any other experts as the best or worst experts in terms of quality and peer-to-peer interactions. In some embodiments, third-party non-users of the site, for example, affiliate persons or entities, professors of the same subject matter as the category of answers or experts, or others may also provide input into reviews or rankings of the characteristics of answers or experts.

The exemplary adjustment module 506 manages other factors which may adjust the score or rank of the experts. These factors may include public, miscellaneous actions associated with the consultation system 102. The actions may include, for example, number of years on the consultation system 102, awards and titles (e.g., mentor, moderator, arbitrator) received on the consultation system 102, uniqueness of posts, time between user question and expert response, number of links in posts, and data associated with the post. The data associated with the post may include analysis of the number of words in a post, number of answers posted before an acceptance of a post is received, and spelling and grammar in posts, for example. Other factors may also include number of years in the expert's profession and number of licenses, certifications, or other credentials obtained by the expert.

Miscellaneous actions may also include non-public actions (e.g., actions which may not be evident to users). For example, the expert may take more shares of non-paying or new users, thus taking a bigger monetary risk. The expert may also move questions posted in a wrong category to a correct category. In another example, the expert may assist with media, marketing, and public relations efforts (e.g., speaking to the press). The expert may also be more or less professional and polite in her interactions with other experts on the site, and more or less act in accordance with the mission and values of the consultation system. Almost any type of factor that can affect the scoring or ranking of experts may be utilized, and the above provided factors are only examples.

The exemplary evaluation module 508 evaluates the experts and outputs a useable result. The evaluation may be based on user feedback, peer feedback, adjustment factors, other factors, or any combination of these. In some embodiments, the evaluation module 508 may generate two results: a public result and an internal result. The public result may be viewable by the public or at least other experts, and may be driven more by user and peer feedback. The internal result may not be viewable by the public, but may be used by the consultation system 102 for internal functions. For example, the internal result may be used to warn or remove the lowest scoring experts in the category (e.g., based on providing poor responses, not interacting professionally or politely with others, or violating site policies). In another example, the internal result may be used to determine an amount that an expert may be paid for posting accepted answers (e.g., the better the score, the better the pay amount). In exemplary embodiments, the internal result may be driven more by factors associated with the adjustment module 506 or other factors. The results may be provided graphically or numerically, in summary fashion or specifically, and in relation to other experts or other categories or not.

In some embodiments, conditions may be automatically or manually set to limit functions of experts. For example, a new expert in a category may not be allowed to post a response after a senior expert (e.g., expert having been on the consultation system 102 longer) has already posted a response. Additionally, peer review reporting privileges of a new expert may be withheld until the new expert reaches a certain threshold of questions answered, responses accepted, or time on the consultation system 102. Alternatively, peer review reporting privileges of non-new experts may be revoked if the non-new expert files too many reports that have been disagreed with by other experts. In another example, experts may be limited to only a set number of questions per day that they can respond to in order to encourage quality of answers as opposed to quantity of answers.

Figure 6:
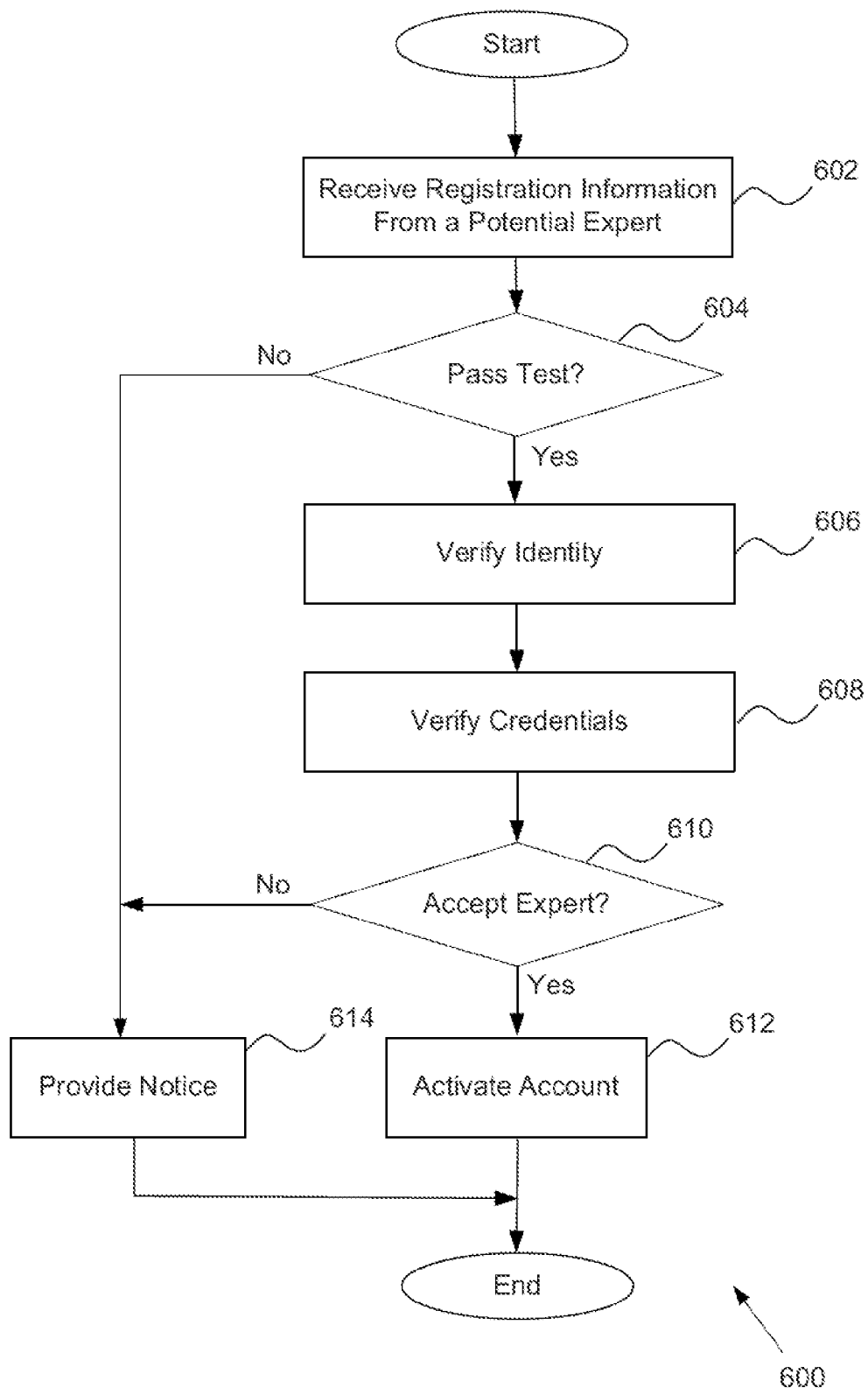
FIG. 6 is a flowchart of an exemplary method for accepting an expert.

FIG. 6 is a flowchart of an exemplary method 600 for accepting an expert. The expert, by definition, may be any person that has knowledge on, and the appropriate qualifications to answer questions relating to, a particular subject matter. Exemplary embodiments of the present invention allow accepted experts to post answers to questions or otherwise provide answers to users of the consultation system 102. In order to be accepted, application and registration information is initially received from a potential expert by the accounts engine 304 at operation 602. The registration information may include name, contact information, other identifying information, education, licenses, certifications, and experiences. The potential expert may also indicate what category or categories to which the potential expert wants to be admitted. Alternatively, the accounts engine 304 may determine and suggest one or more categories best suited for the expert based on credential information (e.g., education, licenses, certifications). For example, the credential information may be compared with the minimum requirements for categories to determine the categories best suited for the expert. In one embodiment, the potential expert may create a profile based on the entered registration information. Examples of expert registration pages are shown in FIG. 8-FIG. 11.

The potential expert may be provided a subject matter test, writing test, site user test, customer service skills test, or other type of test by the testing module 406. The tests may be multiple choice, written, oral, or any combination thereof. In some embodiments, the potential expert may be associated with a general category or a category that does not have a subject matter test. In these embodiments, a test may not be necessary. It should be noted that testing may be optional. If the potential expert does not pass the test, then a notice is provided to the potential expert. In some cases, the potential expert may be given a certain number of chances to pass the test, or may be allowed to take the test at a later date.

If the potential expert passes the test at operation 604, or in some embodiments, simply after the potential expert takes the test at operation 604, then at operation 606, the identity of the potential expert is verified. In exemplary embodiments, the identity verification module 402 manages the verification of the identity. The verification may involve receiving copies of government-issued identification, licenses, or passports or accessing various databases to check provided identity information. The verification may be based, in part, on personal information of the potential expert such as name, address, or date of birth. In some embodiments, the verification is performed by a third party ID verification system.

Credentials are verified at operation 608. The credential verification module 404 manages the verification of credentials including licenses, certifications, educational degrees, awards, patents, publications, and work experiences. In some embodiments, the potential expert provides credential information after their identity is verified or after the test is passed. The credential verification module 406 may access or receive information from external databases (e.g., government or university databases) to verify credentials, or forward the information to a third party verification system for external verification.

At operation 610, a determination is made as to whether to accept the potential expert. Determination at operation 610 may be performed by the acceptance module 408. The determination may be based on test results, qualifications, the application, identity verification, verification of one or more credentials, or any combination thereof. In some embodiments, one or more thresholds may be established which needs to be exceeded in order for the potential expert to be accepted. For example, various combinations of test scores and number/type of verified credentials thresholds may be established, and a potential expert must exceed at least one of these thresholds to be accepted. If accepted, an account is activated or expanded for the expert at operation 612. If the potential expert does not exceed the threshold, then the potential expert is not accepted or given expanded access to questions and a rejection notification may be provided at operation 614.

Figure 7:
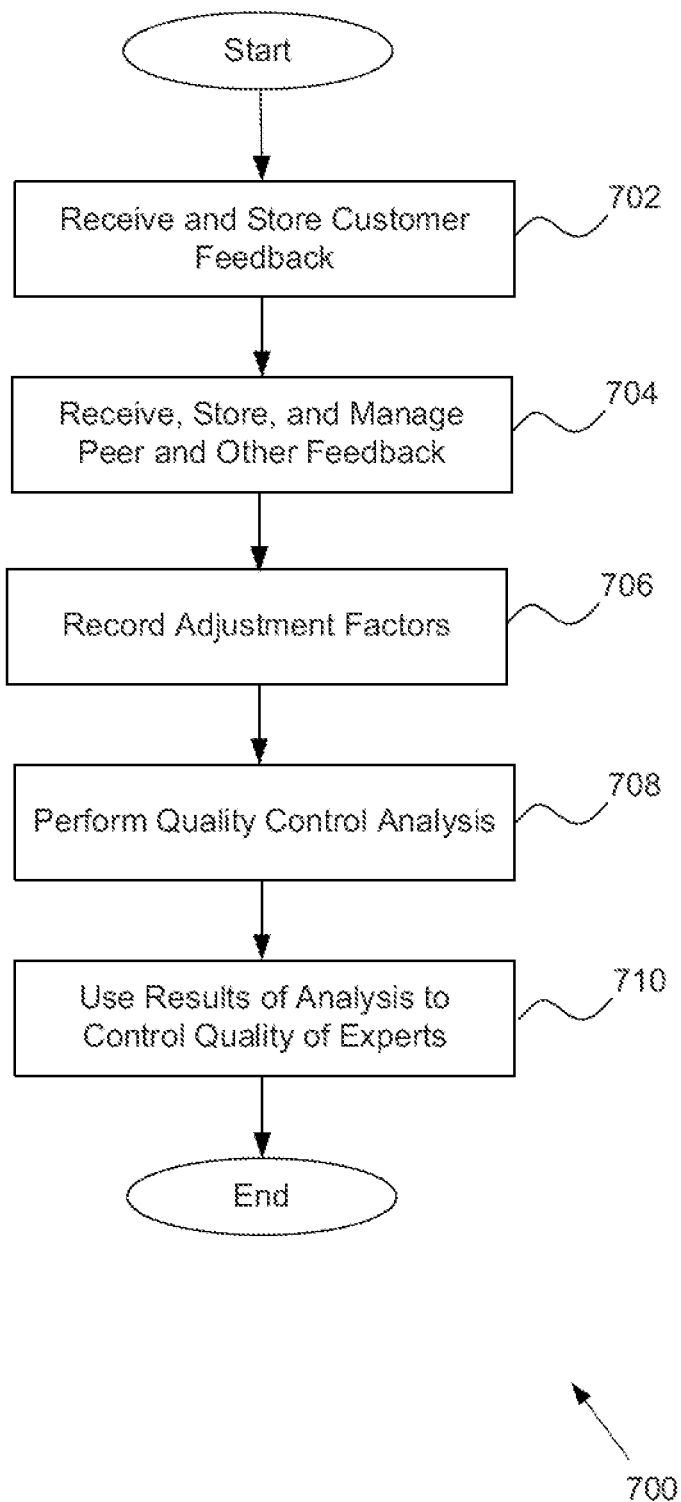
FIG. 7 is a flowchart of an exemplary method for expert quality control.

FIG. 7 is a flowchart of an exemplary method 700 for expert quality control in the consultation system 102. The expert quality control may comprise scoring or ranking experts based on various feedback and factors. The scoring or ranking may be shown to users, shown to the expert involved, shown to other experts with or without attribution to the scored or ranked expert, and used internally by the consultation system. The results of the scoring or ranking may then be used to determine the quality of the experts associated with the consultation system 102 or other pieces of the consultation system including the application and verification process and pricing.

At operation 702, user feedback is received for each expert posting answers on the consultation system 102 in response to a question provided by a user. The user feedback may include direct feedback such as, for example, written comments provided by users, a positive/neutral/negative scoring, complaints, compliments, and user surveys. Indirect feedback may also be included in the user feedback. Examples of indirect feedback include how often users accept an expert's answer, give bonuses to experts, request refunds, opt-out of answers from the expert, and positively rated profiles, and how often users return to ask another question after receiving an answer from the expert. The profile rating is based on a viewable profile of the expert.

Peer feedback from other experts on the consultation system 102 is received at operation 704. For example, a first expert may file a positive or negative report (also referred to as a "peer report") on a second expert or the second expert's answer. The peer report may indicate whether the first expert agrees with the posted answer of the second expert, the reason for the agreement or disagreement, and a new model answer. The peer report may indicate whether it is being submitted due to a problem with the correctness or completeness of an answer, an unprofessional remark or tone, or violations of the law or applicable agreements (e.g., potential copyright infringement). In some embodiments, additional peer review may be solicited and/or provided regarding the report filed by the first expert. In some embodiments, the first and second experts may have an opportunity to correspond to one another, for example, by the second expert agreeing with the first expert's report or filing a refutation of the report, and by the first expert responding or agreeing to withdraw the peer report. Peer feedback may also include experts scoring randomly or manually selected anonymized or non-anonymized answers posted on the consultation system 102.

In some embodiments, the peer report may be provided to the expert being reported on. For example, a report page may be accessible by the expert to view all peer reports submitted about them. The peer reports may be organized, for example, by date, question answered, answer, and type of report. For each peer report, the expert may agree with the peer report or refute the peer report. In addition, an author of a report may retract a report after having reviewed a refutation of the report.

In some embodiments and for some types of reports, a point/strike system may be implemented in peer review. For example, when a peer report is received that pertains to an incorrect answer given by an expert, the expert may (1) do nothing and receive three strikes unless or until the expert decides to agree to or refute the peer report; (2) agree with the peer report resulting in one strike; Or (3) oppose the peer report. In the third case, a panel of reviewers (e.g., three reviewers) may then be selected to review the peer report and disputed answer.

The panel may be randomly chosen from other experts based on, for example, a number of points the experts have. In one example, the potential reviewer may see a pop-up screen reciting "Would you please review an Incorrect/Incomplete Answer report?" The potential reviewer can select "Yes, right now," "Yes, within the next 24 hours," or "No thanks". If "Yes, right now" is selected, the peer report is displayed and the reviewer will have 30 minutes to provide their input on the peer report. If "Yes, within the next 24 hours" is selected, an icon will appear on a reviewer's header tool bar for the next 24 hours. When the icon is clicked, the peer report is displayed, and the reviewer will have 30 minutes to rule on the peer report. If "No thanks" is selected, the same pop-up will appear to another randomly selected potential reviewer. If a reviewer does not provide input within 30 minutes after opening the report to review, a message that their 30-minute window has expired will appear, and their ability to provide their input will go away. In one embodiment, the reviewer will have to agree to an "oath" before reviewing the peer report that states that their input is provided in good faith and solely based upon the correctness and completeness of the answer.

In some embodiments, the reviewers may have two choices for input. The reviewer can agree there is a problem with the incorrect/incomplete answer, or the reviewer may decide there is no substantial problem with the correctness/completeness of the answer. The reviewers may also be asked to provide at least a one sentence reason for their input.

Points and strikes may be awarded based on the outcome of the panel review. For example, if two of the three reviewers find the peer report fully warranted, then the reporter (e.g., the expert that filed the peer report) may receive two points and the author (e.g., the expert that provided the answer) may receive two strikes. However if all three reviewers find the report fully warranted, then the reporter may receive three points and the author may receive three strikes. Alternatively, if the majority of reviews find the report unwarranted, then the report is nullified. Furthermore, if two of three reviewers find the report unwarranted, the reporter may get deducted two points. If all three reviewers find the report unwarranted, the reporter may get deducted three points. Additionally, reviewers voting in the majority with the panel may receive three points, while a reviewer voting in the minority may be deducted one point. In other embodiment, if two of three reviewers find that a report is rude or unprofessional, the author of the report may be deducted two points. However, if all three reviewers find the report is rude or unprofessional, the author of the report may be deducted three points.

Accordingly, experts whose points add up to a negative number after submitting or ruling on at least three peer reports may be "benched" or barred from reporting or reviewing for a period of time (e.g., 100 accepts or 1 month). In a further example, experts whose points add up to a negative number after submitting or ruling on at least nine peer reports may be benched from reporting or reviewing for a longer period of time (e.g., 600 accepts or 6 months). While "benched" experts can continue to file peer reports, the peer reports may not trigger any consequence or process.

Additionally, any authors whose opposition to a peer report is agreed with by the majority of reviewers three times or more may be "safe" from the peer input system for a period of time (e.g., another 100 answers or 1 month).

It should be noted that the peer review method is described in an exemplary embodiment. Other embodiments may use a different number of panel members, provide a different response tune limit, use different or fewer or more report types, apply different standards and methods for experts or other parties to review reports, apply different versions of anonymity or lack of anonymity, apply different selection criteria for answers or experts to be reviewed or of experts or other parties to review the reports, and apply a different point/strike scheme.

At operation 706, other factors which may adjust the score or rank of the experts are recorded. These factors may include miscellaneous actions associated with the consultation system 102 (e.g., number of years on the consultation system 102, awards and titles received on the consultation system 102, uniqueness of posts, number of links in posts, number of characters in posts, and data associated with the post). The factors may also include number of years in the expert's profession and number of licenses, certifications, and other credentials obtained by the expert.

Miscellaneous actions may also include non-public actions performed by the expert which may be beneficial to the consultation system 102. For example, the expert may take more shares of non-paying or new users, move questions posted in a wrong category to a correct category, or assist with media, marketing, or public relations outreach. Almost any type of factor that can affect the scoring or ranking of experts may be recorded and/or tracked.

At operation 708, the quality control analysis is performed and useable results outputted. The quality control analysis may be based on user feedback, peer feedback (e.g., reports, points and strikes), adjustment factors, other factors, or any combination of these. In some embodiments, the evaluation module 508 may generate two results: a public result (e.g., viewable by the public or at least other experts) and an internal result (e.g., used by the consultation system 102 to maintain quality). In exemplary embodiments, the public result may be driven more by user and peer feedback while the internal result may be driven more by factors associated with the adjustment module 506.

At operation 710, the results of the quality control analysis are used for expert quality determination and control. In some embodiments, the public (or visible-to-other-experts) result may be presented, for example, on a website associated with the consultation system 102. For instance, a score or ranking may be provided with an expert profile either graphically or numerically, in summary fashion or specifically, and in relation to other experts or other categories or not. Users may then view the score or ranking in determining whether to accept an answer provided by the expert. In other embodiments, the internal results may be used to maintain quality on the consultation system 102 in a non-public manner. For example, the consultation system 102 may limit the number of experts in a category by using the internal result to remove the lowest scoring experts in the category.

In another example, the internal result may be used to determine a base amount or percentage of a user's payment that an expert may be paid for posting accepted answers. In some embodiments, the results of the quality control analysis may be used to assist the expert in self-monitoring or self-improvement.

FIG. 8 is a screenshot of an example of a portion of the expert registration landing page(s) of the consultation system 102. The expert registration landing page(s) may be provided by the graphical interface engine 302 to the expert client 108. As shown, the expert registration landing page(s) provides information on the application process and access to requirements for categories, as well as the benefits of being an expert. In the present example, the potential expert has selected a "legal experts" category. As a result, requirements are displayed which indicate that the potential expert be an attorney, barrister, or solicitor that is licensed, active, and in good standing. Should the potential expert decide to apply, in some embodiments, the potential user is taken to pages where the potential expert can input personal information, select a category, create a profile, take a test, verify their identity, to describe why they want to be admitted as an expert in the category, and provide credential information.

FIG. 9 illustrates an example of a portion of an expert category selection page, which may or may not be included in the application process. The potential expert may select more than one category.

FIG. 10 is an example of a portion of an identity verification page. The identity verification page provides, in some embodiments, identity test questions (e.g., in the form of multiple choices) to help confirm the identity of the applicant (e.g., potential expert). While certain questions are displayed in the example page of FIG. 10, any question that is known by the applicant (and relatively few others) may be used.

FIG. 11 is an example of a portion of a credential verification page. On this example page, the potential expert selects the category for which they are providing credentials (or it may be pre-populated by the consultation system 102). The potential expert may be asked to write a response to a question about why he or she wants to be an expert. License and certification details are also requested (not shown in displayed portion of the credential verification page).

It should be noted that FIG. 8-FIG. 11 are examples and alternative embodiments may request more, less, or other information from the potential expert or present registration questions, verification questions, or tests in a different manner.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of tune.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 12:
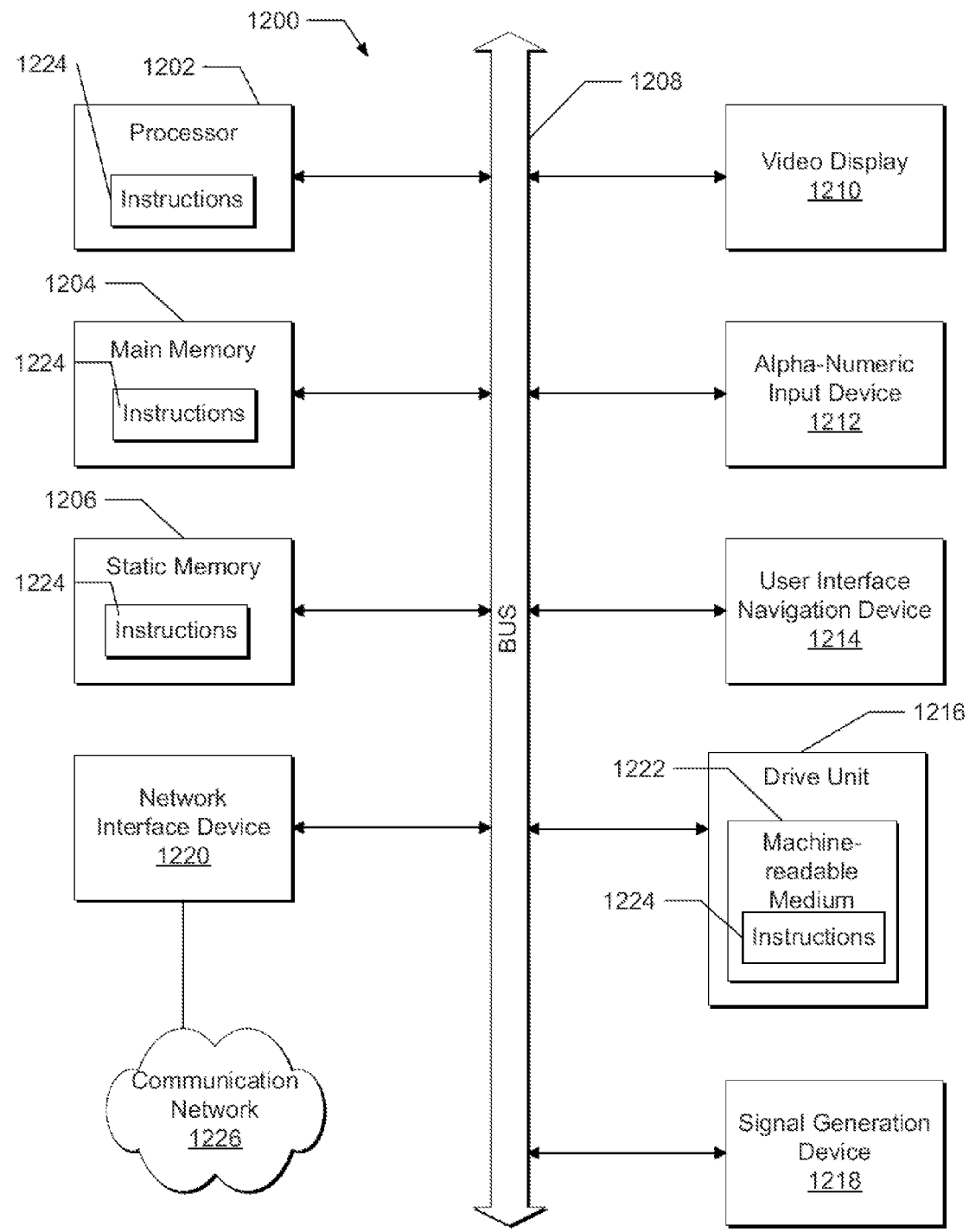
FIG. 12 is a simplified block diagram of a digital device within which a set of instructions, for causing the machine to perform any one or more of the methodologies discussed herein, may be executed.

With reference to FIG. 12, an exemplary embodiment extends to a machine in the exemplary form of a computer system 1200 within which instructions for causing the machine to perform any one or more of the methodologies discussed herein may be executed. In exemplary embodiments, the computer system 1200 may be any one or more of the user client 106, the expert client 108, affiliate system 110, and servers of the consultation system 102. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 may include a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). In exemplary embodiments, the computer system 1200 also includes one or more of an alphanumeric input device 1212 (e.g., a keyboard), a user interface (UI) navigation device or cursor control device 1214 (e.g., a mouse), a disk drive unit 1216, a signal generation device 1218 (e.g., a speaker), and a network interface device 1220.

Machine-Readable Medium

The disk drive unit 1216 includes a machine-readable medium 1222 on which is stored one or more sets of instructions 1224 and data structures (e.g., software instructions) embodying or used by any one or more of the methodologies or functions described herein. The instructions 1224 may also reside, completely or at least partially, within the main memory 1204 or within the processor 1202 during execution thereof by the computer system 1200, the main memory 1204 and the processor 1202 also constituting machine-readable media.

While the machine-readable medium 1222 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term "machine-readable medium" shall also be taken to include any non-transitory storage medium.

Transmission Medium

The instructions 1224 may further be transmitted or received over a communications network 1226 using a transmission medium via the network interface device 1220 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method of verifying experts on an online consultation system, the method comprising:

receiving identity information and credential information at a web server from a device associated with a potential expert;

verifying the identity information and at least a portion of the credential information received from the potential expert;

determining whether to accept the potential expert as an expert based in part on a result of the verifying of the identity and credential information;

determining whether the potential expert meets minimum requirements in a selected category, wherein the minimum requirements are based on characteristics of other experts in the selected category;

administering a customer service skill test to the potential expert;

automatically suggesting to the potential expert the selected category best suited to the expert's qualifications; and activating, using one or more processors, an account associated with the potential expert on the web server to allow the potential expert to become an expert and to allow the expert to provide answers on the consultation system when the potential expert is accepted.

2. The method of claim 1 further comprising providing a test to the potential expert and evaluating a result of the test.

3. The method of claim 2 wherein the receiving and verifying of the credential information occurs based on the identity being verified and the result of the test being positive.

4. The method of claim 1, further comprising determining whether there is a need for a new expert in a selected category.

5. The method of claim 1, wherein the verifying of the identity information comprises providing the potential expert with one or more identity test questions.

6. The method of claim 1, wherein the verifying of the identity information comprises using a third party identity verification system and wherein the verifying of the credential information comprises using a third party credential verification system.

7. The method of claim 1, wherein the potential expert is a member of a plurality of geographically disparate experts and potential experts.

8. The method of claim 1, further comprising evaluating the expert based on feedback from one or more of users, peers, affiliates, or other third-parties.

9. The method of claim 8 further comprising determining whether to deactivate and remove the expert from the consultation system based on the evaluating.

10. An apparatus, comprising:
an accounts engine to receive identity information and credential information at a web server from a potential expert;
at least one verification module to verify the identity information and at least a portion of the credential information received from the potential expert; and
an acceptance module to determine whether to accept the potential expert as an expert based on a result from at the least one verification module, wherein the acceptance module is further to determine whether the potential expert meets minimum requirements in a selected category, the minimum requirements being based on characteristics of other experts in the selected category, wherein a testing module administers a customer service skill test to the potential expert, and wherein the accounts engine automatically suggests to the potential expert the selected category best suited to the expert's qualifications; and
to activate, using one or more processors, an account associated with the potential expert to become an expert and to allow the expert to provide answers on the consultation system when the potential expert is accepted.

11. The apparatus of claim 10 further comprising a testing module to provide a test to the potential expert and to evaluate a result of the test.

12. The apparatus of claim 10, wherein the acceptance module is further to determine whether there is a need for a new expert in a selected category.

13. The apparatus of claim 10, wherein the at least one verification module further provides the potential expert with one or more identity test questions to verify the identity of the potential expert.

14. The apparatus of claim 10, further comprising a quality control engine to evaluate the expert based on feedback from one or more of users, peers, affiliates, or other third-parties.

15. The apparatus of claim 14, wherein the quality control engine is further to determine whether to deactivate and remove the expert from the consultation system based on the evaluation.

16. A non-transitory machine-readable storage medium having embodied thereon instructions which when executed by at least one processor, causes a machine to perform operations comprising:
receiving identity information and credential information at a web server from a potential expert;
verifying the identity information and at least a portion of the credential information received from the potential expert;
determining whether to accept the potential expert as an expert based on a result of the verifying of the identity and credential information;
determining whether the potential expert meets minimum requirements in a selected category, wherein the minimum requirements are based on characteristics of other experts in the selected category;
administering a customer service skill test to the potential expert;
automatically suggesting to the potential expert the selected category best suited to the expert's qualifications; and
activating an account associated with the potential expert on the web server to allow the potential expert to become an expert and to allow the expert to provide answers on the consultation system when the potential expert is accepted.

17. The non-transitory machine-readable storage medium of claim 16, wherein the method further comprises determining one or more categories for the expert based on the credential information received from the potential expert.

* * * * *